June 6, 1967

KUNITOSHI TEZUKA 3,323,908

METHOD OF SEPARATING FERROUS AND NON-FERROUS
METALS OF A USED CAR OR THE LIKE
FROM EACH OTHER
Filed July 28, 1964

*Fig. 1.*

*Fig. 2.*

INVENTOR.
Kunitoshi Tezuka

BY George B. Oujralk
Attorney

3,323,908
METHOD OF SEPARATING FERROUS AND NON-FERROUS METALS OF A USED CAR OR THE LIKE FROM EACH OTHER
Kunitoshi Tezuka, 34, 7 Minami Sunamachi, Koto-ku, Tokyo-to, Japan
Filed July 28, 1964, Ser. No. 385,613
Claims priority, application Japan, Feb. 28, 1964, 39/10,665
1 Claim. (Cl. 75—63)

This invention relates to a method of separating ferrous and non-ferrous metals of a used car or the like from each other.

In spite of the fact that there are an ever increasing number of new cars produced, and that there are an increasing number of vehicles in junkyards, little attention has been heretofore paid to the reutilization of the materials of these scrapped cars. In order to effectively utilize these materials as production materials, it is necessary to separate non-ferrous metals such as lead alloy, tin alloy, copper alloy and the like and ferrous metals from each other. Conventionally, a method of separating ferrous and non-ferrous metals from each other is by means of evaporation and is known in the art, however, this method lacks industrial value, since a large amount of money is required for the construction of a vacuum chamber and a relatively long period of time is required for the evaporation. Therefore, even today, separation of ferrous and non-ferrous metals is manually performed as a home industry. The valuable production materials are kept as buried treasure and reutilization thereof is not commonly under way, therefore, economic demands for these metals still can not be met.

One of the objects of the present invention is to provide a method which includes hermetically closing a furnace for heat treating a junk automobile containing ferrous and non-ferrous metals, holding said automobile between holding plates having spikes and provided on the ends of rotary shafts in opposing relationship to each other, rotating said automobile at a reduced speed through a reduction gear mounted on one of the rotary shafts, adjusting the increase and decrease in heating temperature in accordance with the melting point of the respective non-ferrous metals contained in said automobile by means of a heating device such as a burner provided on one side of the furnace so as to gradually melt the non-ferrous metals, and causing the respective melted non-ferrous metals to drip down by gravity and the rotational vibration caused by rotation of the automobile so as to separate the ferrous and non-ferrous metals.

The accompanying drawing illustrates an embodiment of an arrangement for separating ferrous and non-ferrous metals of a junk car or the like from each other in accordance with the present invention, in which:

FIG. 1 is a longitudinal sectional view; and
FIG. 2 is a sectional view taken along line A—A of FIG. 1.

Referring to the drawings showing a preferred embodiment of this invention, reference numeral 1 represents a heating furnace provided with a heating device such as an oil burner 2, reference numeral 3 represents a sloping plate disposed within the heating furnace. The furnace is provided with a door 5 to permit an automobile 10 to go in and out of the heating furnace and a door 6 to permit the melted materials to be withdrawn from the heating furnace. Reference numeral 7 represents a non-ferrous metal withdrawing hollow truck adapted to be positioned on the outside of the door 6. The automobile 10 is displaced upward or downward by a suitable mechanism so as to adjust the position of the automobile to be held between the holding plates 8 and 9 having spikes and provided on the ends of rotating shafts facing with each other. A reduction gear 13 is mounted on an end of one of the rotary shafts in cooperating relationship therewith. The rotary shafts are rotated at a reduced speed through the reduction gear 13 and retractably displaced by hydraulic or other suitable driving means 11. The rotary shafts are rotated by means of a prime mover 12 at a reduced speed through the reduction gear 13 as described above, so that the automobile 10 such as, for example, a junk car held between the holding plates 8 and 9 is accordingly rotated. Reference numerals 14 represent bearings, and reference numerals 15 represent guide plates.

The operation of the aforementioned embodiment is as follows:

The automobile 10 such as, for example, a junk car disposed on the carrying vehicle 4 is transferred into the heating furnace 1, the position of the carrying vehicle 4 is adjusted so that the automobile 10 can be suitably held between the holding plates 8 and 9, and then the door 5 is hermetically closed. The rotary shafts are rotated at a reduced speed through the reduction gear 13 while the automobile is being heated by means of a heating device such as a burner 2 in accordance with the melting point of the respective non-ferrous metal contained in the automoblie. Thus, the automobile is rotated while being held between the holding plates 8 and 9, and heated inside of the heating furnace 1 by means of the heating device 2, so that a non-ferrous metal contained in the object as, for example, tin alloy contained in the cylinder, engine and the like is melted when the heating temperature reaches its melting point 230° C., and thus melted material is separated from the automobile and dropped down onto the sloping plate 3.

The separation of the melted non-ferrous metals from the object is facilitated by the fact that the melted non-ferrous metals drop down due to their own weights and the rotational vibration caused by rotating the automobile held between the holding plates 8 and 9 within the furnace. In order to perform this dropping separation, the automobile must be heated while being rotated. At a suitable time, the door 6 is opened in order to withdraw the melted material by means of the truck 7, thereafter the door 6 will be closed again to hermetically close the heating furnace 1, which will be heated up to the melting point 650° C. of a non-ferrous metal such as, for example, copper, and thus the non-ferrous metal is melted and separated from the automobile with the latter being rotated, as described above. The treating of the non-ferrous metals wherein each has a different melting point is adjusted in accordance with the melting point of the respective non-ferrous metals contained in the automobile, the heat treatment is repeatedly carried out so as to gradually separate the ferrous and non-ferrous metals from each other until only the ferrous metals are left in the automobile, and thus the separation operation is completed. Likewise, it is possible to melt the ferrous metals by heating the same up to their melting points.

As described above, in accordance with this invention, the used car or the like is held between the holding plates 8 and 9 having spikes within the heating furnace 1 and rotated at a reduced speed through the reduction gear 13. On the other hand, the heating of the used car is adjusted in accordance with the melting point of the respective non-ferrous metals contained in the used car, thereby gradually separating the respective non-ferrous metal from the object.

Since the separation method of this invention is simple the apparatus therefor can be constructed at a low cost, and this invention has considerable industrial value so that by successively supplying used cars containing ferrous and non-ferrous metals, the same are separated and these materials can be utilized as valuable production materials, thus meeting economic demands.

What I claim is:

A process for the separation of ferrous and non-ferrous metals contained in junk automobiles, comprising the steps of, (a) supporting the junk automobile rotatably at its ends within a furnace, (b) hermetically sealing the furnace, (c) slowly rotating said automobile while concurrently heating said furnace, (d) raising the heat of said furnace in increments corresponding to the various melting temperatures of the various metals in the automobile, so that said metals will successively melt out and flow by gravity to the bottom of said furnace, and (e) successively withdrawing the liquid metal at the bottom of said furnace as each metal is melted out of said automobile.

References Cited

UNITED STATES PATENTS

| | | | |
|---|---|---|---|
| 1,669,485 | 5/1928 | Nordling et al. | |
| 1,938,239 | 12/1933 | White | 75—63 |
| 2,596,345 | 5/1952 | Penrod | 148—153 |

BENJAMIN HENKIN, *Primary Examiner.*